(12) United States Patent
Lefebvre et al.

(10) Patent No.: US 11,739,664 B1
(45) Date of Patent: Aug. 29, 2023

(54) SERVICE TUBE LOCKING DEVICE

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA); Philippe Savard, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/655,205

(22) Filed: Mar. 17, 2022

(51) Int. Cl.
*F01D 25/28* (2006.01)
*F01D 25/18* (2006.01)
*F01D 25/16* (2006.01)
*F01D 9/06* (2006.01)

(52) U.S. Cl.
CPC ............ *F01D 25/28* (2013.01); *F01D 9/065* (2013.01); *F01D 25/16* (2013.01); *F01D 25/18* (2013.01); *F05D 2230/72* (2013.01); *F05D 2250/232* (2013.01); *F05D 2250/63* (2013.01); *F05D 2260/31* (2013.01); *F05D 2260/98* (2013.01)

(58) Field of Classification Search
CPC .......... F01D 25/28; F01D 9/065; F01D 25/16; F01D 25/18; F05D 2230/72; F05D 2250/232; F05D 2250/63; F05D 2260/31; F05D 2260/98

USPC ......................................................... 415/110
See application file for complete search history.

(56) References Cited

U.S. PATENT DOCUMENTS

| | | | |
|---|---|---|---|
| 3,469,852 A | 9/1969 | Smith et al. | |
| 5,782,576 A | 7/1998 | Schlemenat et al. | |
| 6,199,453 B1* | 3/2001 | Steinbock | B23P 19/068 81/57.38 |
| 10,087,847 B2 | 10/2018 | Szymanski | |
| 10,385,710 B2 | 8/2019 | Hendrickson | |
| 11,041,438 B2 | 6/2021 | Agara et al. | |
| 2016/0041356 A1* | 2/2016 | Wang | G02B 6/3825 385/56 |
| 2018/0224043 A1* | 8/2018 | Hendrickson | F01D 25/162 |
| 2018/0333812 A1* | 11/2018 | Miller | F01D 25/243 |
| 2020/0248455 A1* | 8/2020 | Chich | E04D 1/2914 |

* cited by examiner

*Primary Examiner* — Yi-Kai Wang
(74) *Attorney, Agent, or Firm* — Norton Rose Fulbright Canada LLP

(57) ABSTRACT

A service tube assembly comprises a service tube having a threaded end portion and a shoulder. The outer shoulder has a conical surface converging in a direction away from the threaded end portion. The threaded end portion is threadably engaged with a mating part. The mating part has a seat surface which cooperates with the shoulder of the service tube to form a conical seat. The assembly further includes a locking member having an outer conical surface complementary to the conical seat. A mechanical fastener is provided for releasably holding the locking member against the conical seat.

20 Claims, 5 Drawing Sheets

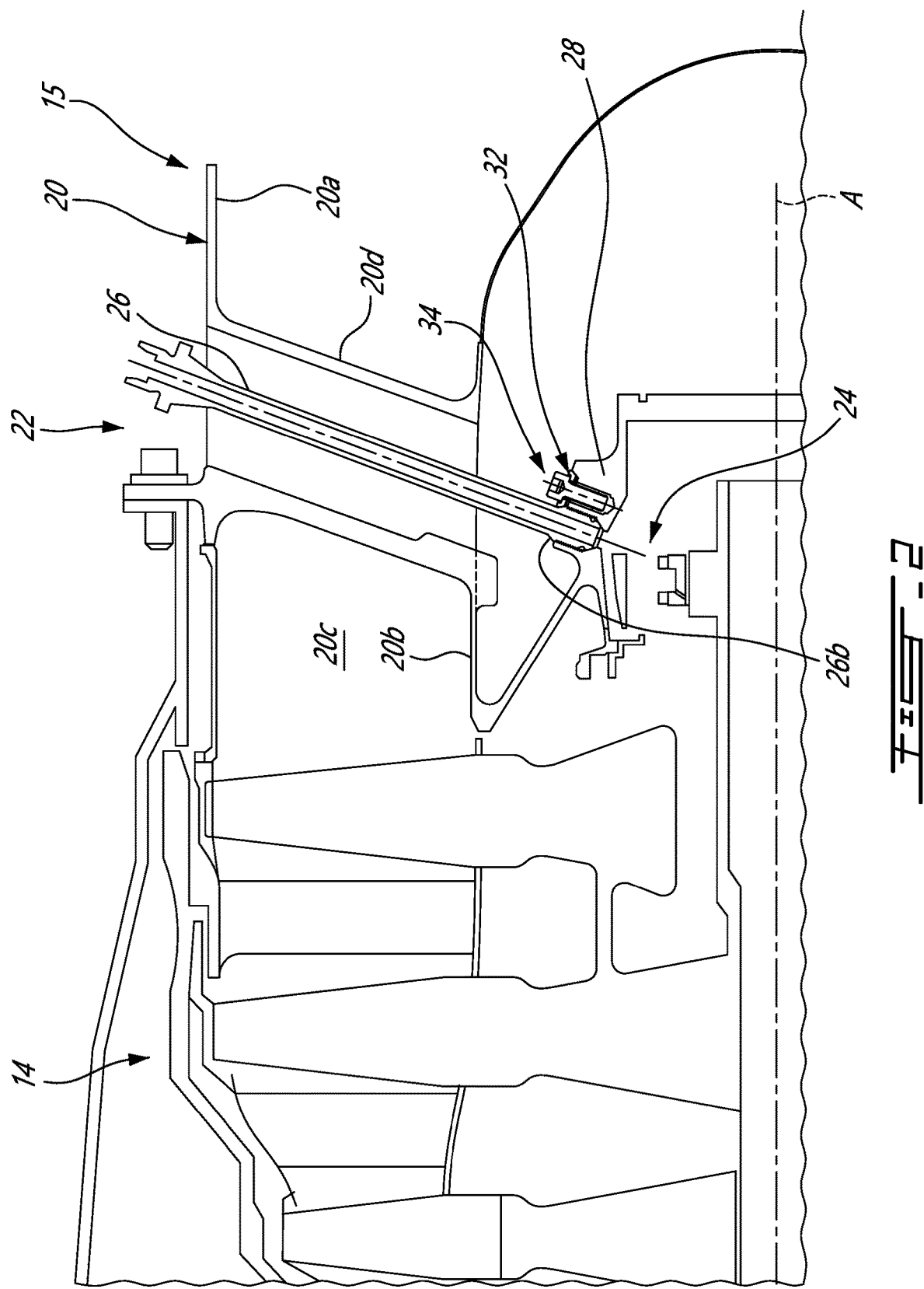

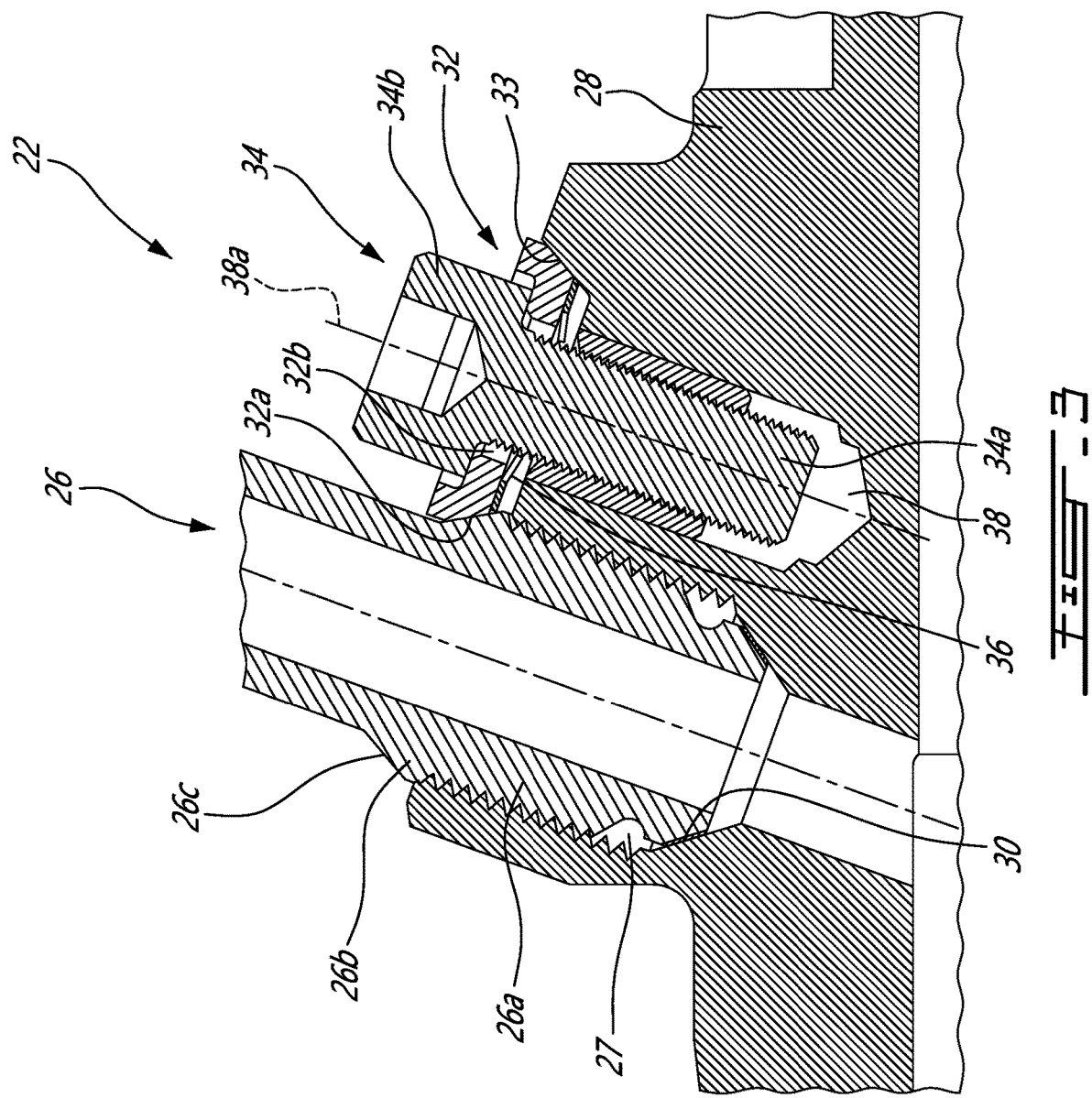

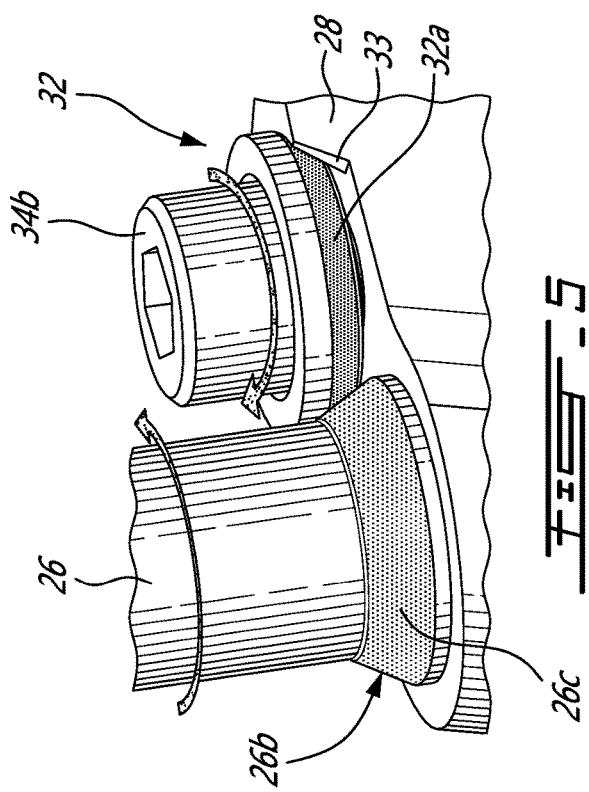
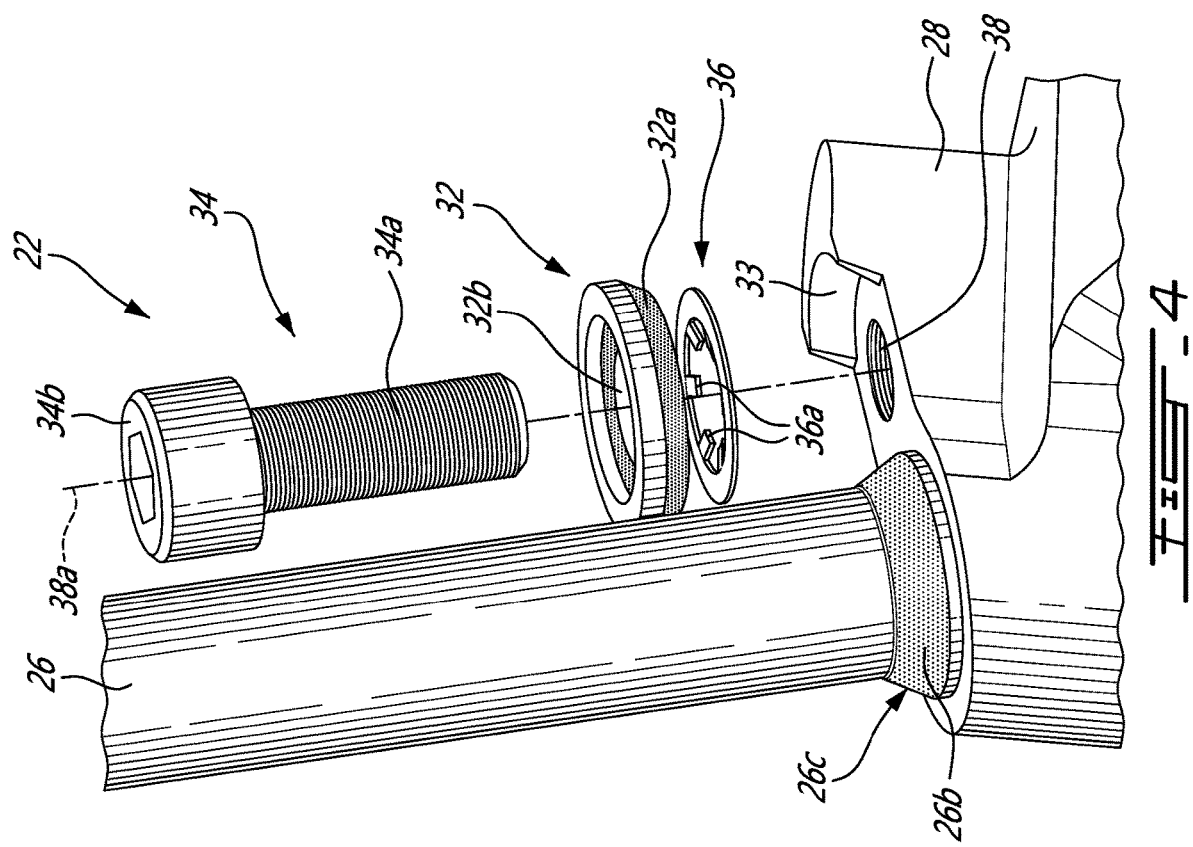

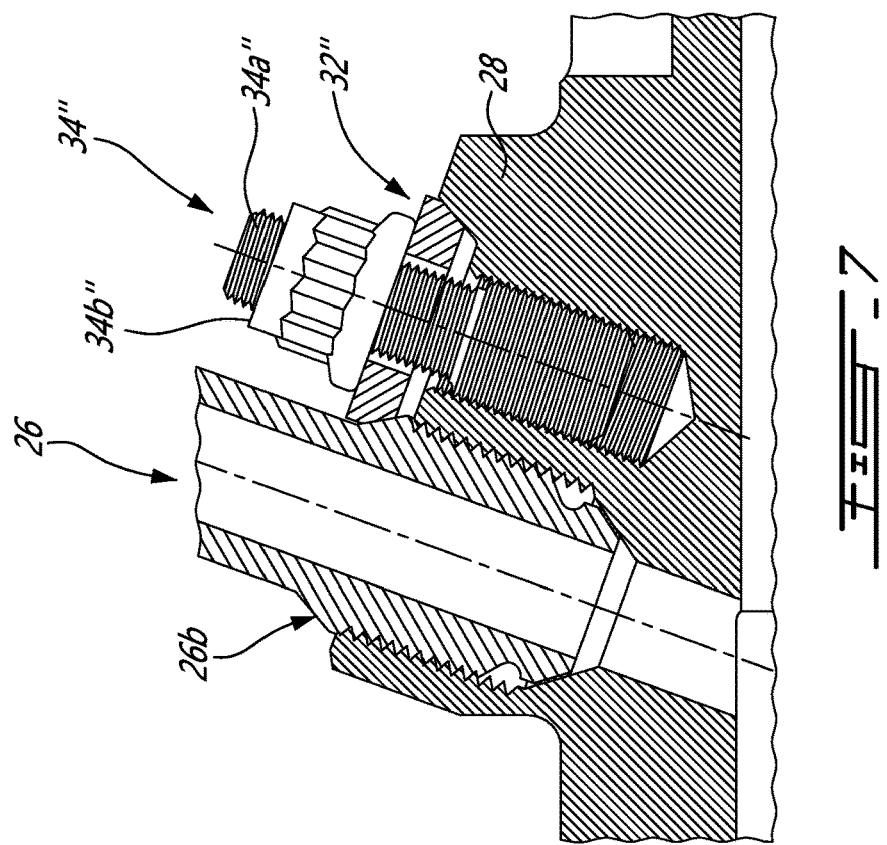
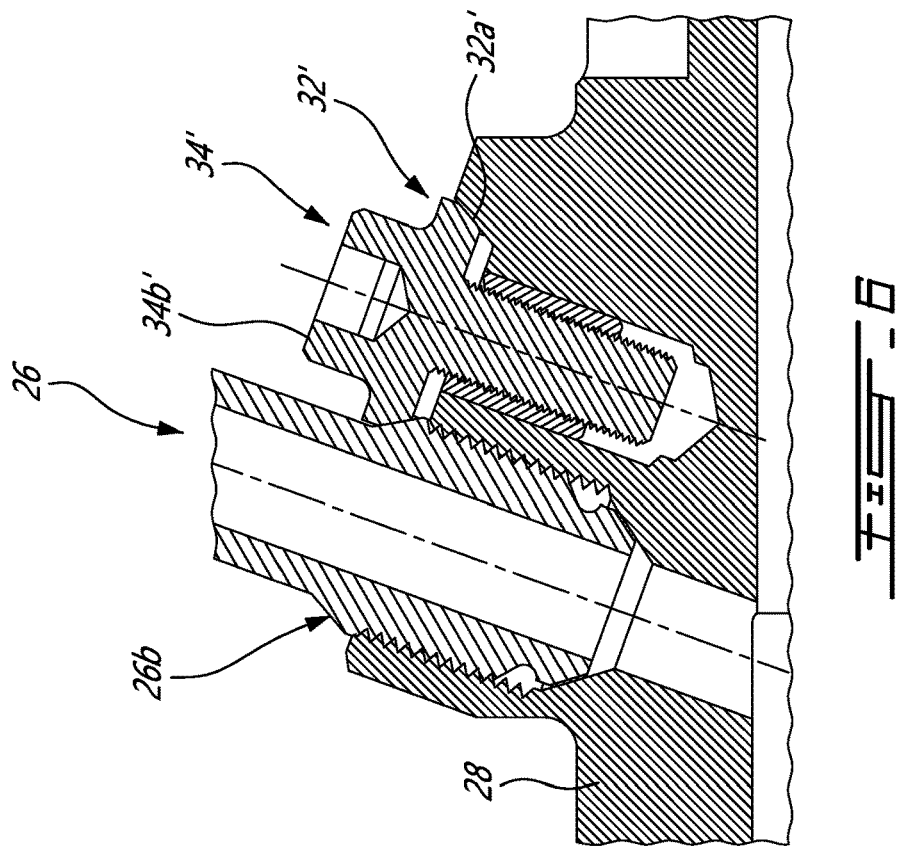

SERVICE TUBE LOCKING DEVICE

TECHNICAL FIELD

The disclosure relates generally to service tubes and, more particularly, to service tube assemblies.

BACKGROUND OF THE ART

Turbine engines include various pipes or tubes therein for directing air, fuel, oil or mixtures thereof to engine components. Threaded connections are often used between such tubes and the associated engine components. However, threaded connections are susceptible to loosening after assembly due to various factors, such as vibrations, impacts, or alternating thermal loads to name a few.

SUMMARY

In one aspect, there is provided a service tube assembly for an aircraft engine, comprising: a service tube having a threaded end portion and an outer shoulder adjacent to the threaded end portion, the outer shoulder having a conical surface converging in a direction away from the threaded end portion; a mating part threadably engaged with the threaded end portion of the service tube, the mating part having a seat surface surrounding at least a portion of a circumference of the outer shoulder of the service tube, the seat surface of the mating part and the conical surface of the outer shoulder of the service tube forming a conical seat therebetween; a locking member having an outer conical surface complementary to the conical seat; and a mechanical fastener releasably holding the locking member against the conical seat.

In another aspect, there is provided a turbine exhaust case comprising: an outer duct wall and an inner duct wall defining therebetween an annular gas path about an engine axis; a strut extending across the annular gas path; a service tube extending through the strut, the service tube having a threaded inner end portion and an outer shoulder adjacent to the threaded inner end portion; a bearing housing disposed radially inwardly from the inner duct wall, the bearing housing having a threaded bore, the threaded inner end portion of the service tube threadably engaged with the threaded bore, the bearing housing further having a seat surface surrounding at least a portion of a circumference of the threaded bore, the seat surface of the bearing housing and the outer shoulder of the service tube forming a conical seat; a locking member having a conical surface seated against the conical seat; and a threaded fastener threadably engaged with the bearing housing, the threaded fastener tightened to press the locking member against the conical seat.

In a further aspect, there is provided a method of assembling a service tube to an engine component, the method comprising: threadably engaging the service tube with the engine component; and locking the service tube against rotation relative to the engine component, including tightening a locking member having a conical surface in compression against a conical seat jointly formed by an outer shoulder on the service tube and a seat surface on the engine component.

DESCRIPTION OF THE DRAWINGS

Reference is now made to the accompanying figures in which:

FIG. 2 is a schematic cross-section view of a turbine exhaust case of the engine shown in FIG. 1;

FIG. 3 is a cross-section view of a turbine exhaust case service tube assembly;

FIG. 4 is a partly exploded isometric view of the service tube assembly shown in FIG. 3;

FIG. 5 is an isometric view of the service tube assembly;

FIG. 6 is a cross-section view of a service tube assembly illustrating a locking device integrated to a bolt head;

FIG. 7 is a cross-section view of another service tube assembly including a threaded stud and a nut.

DETAILED DESCRIPTION

Figure 1:
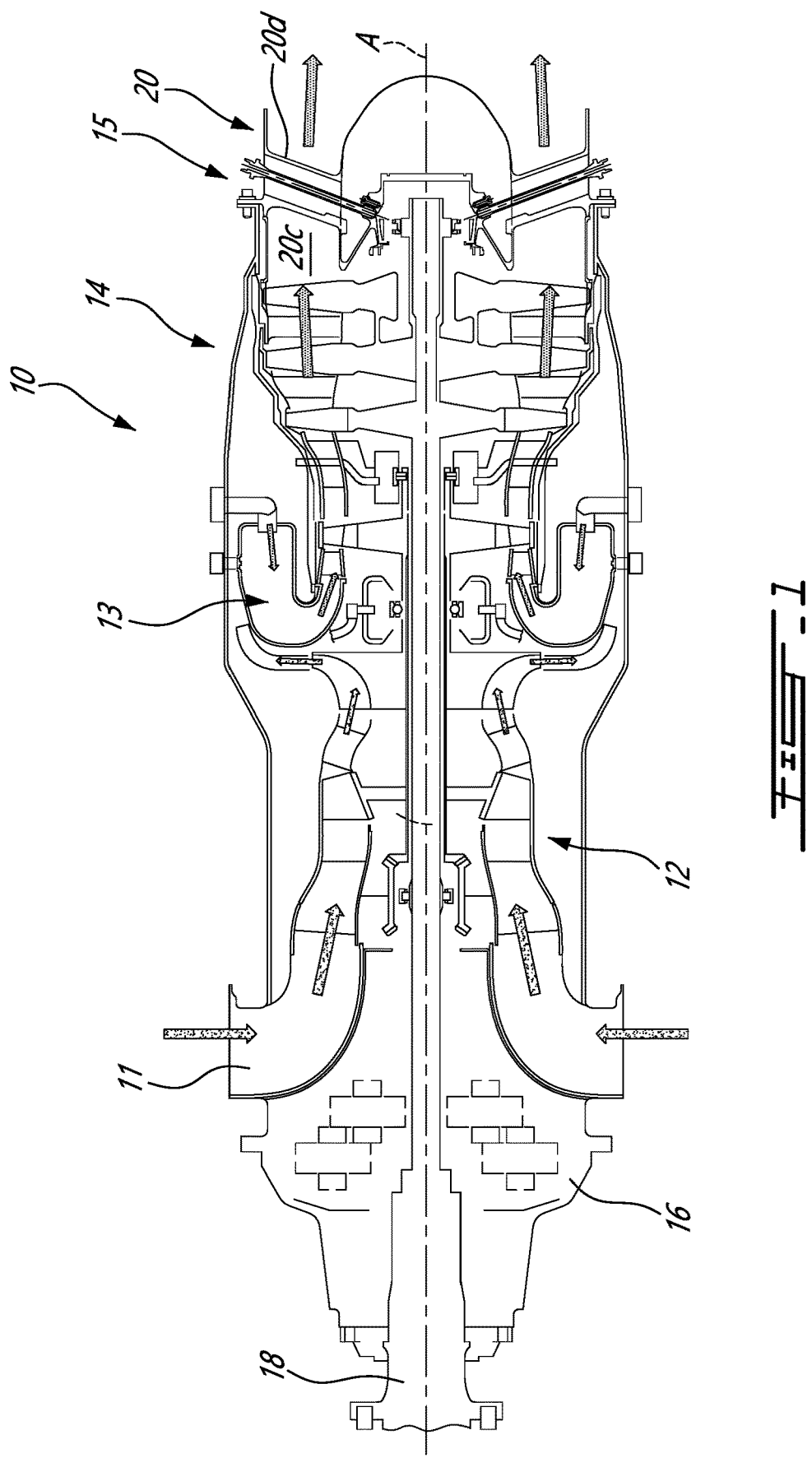
FIG. 1 is a schematic cross section view of a gas turbine engine.

The description is generally directed to systems, methods, and other devices related to routing fluid flow (e.g. air, oil, fuel or mixtures thereof) in an engine and, more particularly, to systems, methods and devices for securing a threaded connection between a service tube and an associated engine component or mating part. The mating part can be any features configured for connection to a service tube. For purposes of illustration, the technology will be described with respect to an aircraft gas turbine engine. It will be understood, however, that the technology is not so limited and may have general applicability in non-aircraft applications, such as other mobile applications and non-mobile industrial, commercial, and residential applications, including power generation. Furthermore, even though the following description and accompanying drawings specifically refer to an Auxiliary Power Unit (APU) as an example, it is understood that aspects of the present disclosure may be equally applicable to a wide variety of engines including all types of gas turbine (e.g., continuous combustion) engines, internal (e.g., intermittent) combustion engines, electric powerplants and hybrid powerplants to name a few. It should be further understood that while a particular embodiment is described in reference to a service tube within a strut of a turbine exhaust case, the features of the exemplified service tube assembly could be applied to other service tube assemblies within the engine or along the engine case.

The term "service tube" is herein intended to encompass any tube that can be used in an engine to route a fluid, such as air, oil, air/oil mixture, etc. to an engine component.

The terms "attached", "coupled", "connected" or "engaged" may include both direct attachment, coupling, connection or engagement (in which two components contact each other) and indirect attachment, coupling, connection or engagement (in which at least one additional component is located between the two components).

The terms "substantially" and "generally" as used herein may be applied to modify any quantitative representation which could permissibly vary without resulting in a change in the basic function to which it is related.

Aspects of various embodiments will now be described through reference to the drawings.

FIG. 1 illustrates a gas turbine engine 10 suitable for use as an APU and generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. According to the illustrated exemplary engine, the turbine 14 is drivingly connected to an input end of a reduction gearbox RGB 16. The RGB 16 has an output end drivingly connected to an output shaft 18 configured to drive a rotatable load, such as a generator (not shown).

Turning to FIG. 2, it can be seen that the exhaust 15 comprises a turbine exhaust case 20 having an outer duct wall 20a and an inner duct wall 20b defining therebetween an annular gas path 20c extending about an engine axis A. The exhaust case 20 further comprises a plurality of struts 20d circumferentially interspaced from one another and extending generally radially across the annular gas path 20c from the outer duct wall 20a to the inner duct wall 20b, thereby structurally interconnecting the outer and inner duct walls 20a, 20b. The struts 20d can have an airfoil profile for directing the exhaust gases received from the turbine 14. A service tube assembly 22 can be disposed in a hollow interior of one or more of the struts 20d for feeding a service fluid, such as air, oil or an oil/air medium, to an engine component disposed radially inwardly of the gas path 20c. According to the illustrated embodiment, the service tube assembly 22 is used to provide oil to a bearing 24 mounted inside the exhaust case 15 for supporting an aft end of a main rotor of the engine 10 (e.g. the aft end of a low pressure spool).

Referring jointly to FIGS. 2 and 3, it can be appreciated that the service tube assembly 22 comprises a service tube 26 having a threaded inner end portion 26a threadably engaged in a corresponding threaded bore 27 defined in an outer surface of a bearing housing 28 of the bearing 24. The service tube 26 is tightened to a predetermined torque to compress a seal 30 in sealing engagement with a corresponding sealing surface circumscribing an inner end portion of the threaded bore 27 in the bearing housing 28. Over time, such a threaded connection may become loose, which may result in oil leakage at the service tube and bearing housing interface.

It is herein proposed to provide the service tube assembly 22 with an anti-loosening or locking structure to restrain the service tube 26 against rotation after the same has been fastened to the specified torque. The anti-loosening structure generally comprises a locking member 32 engageable with both the service tube 26 and the bearing housing 28 to frictionally lock the service tube 26 against rotation relative to the bearing housing 28. As shown in FIGS. 3 to 5, the locking member 32 has an outer conical surface 32a configured to be firmly pressed against a mating/complementary conical seat jointly formed by an outer shoulder 26b on the service tube 26 and a seat surface 33 integrally formed on the outer surface of the bearing housing 28. The conical shape of the mating surfaces contributes to maximize the friction surfaces between the components and, thus, provide enhanced locking function.

As best shown in FIG. 3, the outer shoulder 26b is provided adjacent or next to the threaded inner end portion 26a of the service tube 26 so as to extend outwardly from the outer surface of the bearing housing 28 once the service tube 26 has been suitably tightened thereon. The shoulder 26b extends continuously around a full circumference of the tube 26 and has a conical surface 26c converging in a direction away from the threaded inner end portion 26a. As best shown in FIG. 4, the seat surface 33 on the bearing housing 28 is positioned on a side of the threaded bore 27 so as to surround at least a portion of a circumference of the outer shoulder 26b of the service tube 26 when the same is installed on the bearing housing 28. The seat surface 33 has a conical profile with a cone angle corresponding to that of the conical surface 26c. In other words and as shown in FIG. 3, the conical surface 26c and the seat surface 33 diverge at the same rate from the outer surface of the bearing housing 28 so as to offer a uniform funnel-shaped seat for the locking member 32.

The locking member 32 may be removably secured in a locking position against the conical seat formed by the service tube 26 and the bearing housing 28 by means of any suitable mechanical fasteners configured for drawing or pushing the locking member 32 against the conical surface 26c of the tube shoulder 26b and the seat surface 33 of the bearing housing 28 with sufficient force to frictionally restrain the service tube 26 against rotation after it has been tightened to the specified torque. For instance, as shown in FIGS. 3-5, the locking member 32 may be embodied in the form of a conical sleeve/ring having a central bore 32b for engagement with a threaded fastener, such as a bolt 34. According to this particular embodiment, the locking member 32 may be pre-installed on the shank 34a of the bolt 34 against an undersurface of the bolt head 34b and retained thereon by any suitable means, such as a retaining clip/ring. As best shown in FIG. 4, the retaining clip/ring can be provided in the form of a lock washer 36 with bendable gripping tabs 36a distributed along an inner diameter of the washer 36 for gripping engagement with the shank 34a of the bolt 34. In this way, the lock washer 36 can be used to act as an axial stopper to prevent the locking member 32 from slipping off the shank 34a of the bolt 34 during assembly.

The bolt 34 with the locking member 32 retained thereon by the lock washer 36 may be threadably engaged with a corresponding threaded bore 38 defined in the outer surface of the bearing housing 28 at a location between the threaded bore 27 (and thus the service tube 26) and the seat surface 33. As can be appreciated from FIG. 3, the axis 38a of the threaded bore 38 is substantially coaxial to the central axis of the conical seat formed by the seat surface 33 and the conical surface 26c of the outer shoulder 26b of the service tube 26. This provides for a symmetrical distribution of the load from the locking member 32 to the conical surface 26c on the service tube 26 and the seat surface 33 on the bearing housing 28 when the bolt 34 is tightened onto the bearing housing 28. The conical interface between the locking member 32 and the mating conical seat allows for a self-centering function of the locking member 32 as the same is being compressed against its seat by the bolt 34. As shown in FIG. 3, the cross-section of the central bore 32b of the locking member 32 is greater than that of the shank 34a of the bolt 34 but smaller than that of the bolt head 34b. The resulting annular gap between the locking member 32 and the shank 34a of the bolt 34 allows the locking member 32 to laterally move relative to the shank 34a of the bolt 34 as the locking member 32 is drawn into its conical seat by the bolt 34. This allows to compensate for potential misalignments between the bolt axis and the central axis of the conical seat due to tolerance stack up or the like.

As shown in FIGS. 4 and 5, the conical surface 26c of the outer shoulder 26b of the service tube 26 and the conical surface 32a of the locking member 32 can be textured or treated to increase frictional contact between the service tube 26 and the locking member 32. For instance, a knurled surface finish may be applied to both mating conical surfaces 26c, 32a. The locking member 32 may also have a material hardness that is less than that of the service tube 26 and the bearing housing 28 to further avoid the outer shoulder 26b of the service tube 26 to slip on the mating conical surface 32a of the locking member 32.

As shown in FIG. 5, in the event that a counter clockwise torque is applied to the tube 26, the resultant load will be transferred in a clockwise direction to the locking member 32 and the bolt 34, thereby increasing the torque on the bolt 34 and, thus, further securing the service tube 26 against rotation. In some applications, an anti-rotation feature (not shown), such as a key, may be provided between the bolt 34 and the locking member 32 to ensure that any torque transferred to the locking member 32 is transmitted to the bolt 34.

According to one possible installation procedure, the service tube 26 is first inserted through the strut 20*d* to threadably engage the threaded inner end portion 26*a* of the tube 26 in the threaded bore 27 on the bearing housing 28. The service tube 26 is then tightened to a selected torque to compress the seal 30 inside the bore 27. Thereafter, the threaded connection between the service tube 26 and the bearing housing 28 is secured with the help of the locking member 32. According to the embodiment illustrated in FIGS. 3-5, the locking member 32 is pre-assembled on the shank 34*a* of the bolt 34 with the lock washer 36. Then, the bolt 34 is inserted through the strut 20*d* for threaded engagement with the associated threaded bore 38 in the bearing housing 28. The bolt 34 is tightened to a selected torque to compress the locking member 32 against the conical seat formed by the outer shoulder 26*b* of the service tube 26 and the seat surface 33 of the bearing housing 28. The torque on bolt 34 is selected so that the locking member 32 frictionally locks the service tube 26 in rotation relative to the bearing housing 28, thereby preventing the loosening of the service tube threaded connection. The locking load is provided by the bolt 34 and is transferred to the service tube 26 via the conical interface between conical surface 26*c* of the service tube 26 and the conical surface 32*a* of the locking member 32. Such a frictional based locking arrangement has the advantage of not being dependent upon any interlocking features that need to be angularly aligned to achieve the desired locking function. It this way, the service tube can be tighten to the selected torque without any consideration for its angular orientation with respect to a neighboring interlocking feature. The conical interface allows to exert a locking action on the service tube 26 both in a tube axial direction and a tube circumferential direction and that directly at the threaded extremity of the tube 26. Providing the locking function at the inner end of the service tube 26 near to the threaded interface with the bearing housing provides enhance locking function and eliminate the complexity of having a locking device that interfaces with another module/hardware of the engine, thereby potentially avoiding the need to dis-assemble surrounding hardware to access/inspect/install the service tube 26. It provides a simple and compact design, which may lead to engine cost and weight savings. Locking the service tube 26 at the threaded connection as opposed to at the other extremity of the tube may also allow to have a lighter tube since tube rigidity is of less concern to sustain torsion along the tube.

As shown in FIG. 6, it is also herein contemplated to integrate the locking member 32 to the fastener (i.e. the locking member and the fastener could be of unitary construction). For instance, the locking member 32' could be provided in the form of a conical shoulder projecting from the head 34*b*' of a bolt 34'. This alternative eliminates the need for a locking washer to hold the locking member on the shank of the bolt. However, still according to this alternative, the locking member 32 is no longer laterally adjustable relative to the shank of the bolt to accommodate for tolerance stack up between the conical surfaces of the service tube 26 and the seat surface 33 of the bearing housing 28.

FIG. 7 illustrates another possible alternative wherein the fastener includes a threaded stud 34*a*" projecting outwardly from the bearing housing 28 and a nut 34*b*" threadably engaged on the threaded stud 34*a*" for pressing the locking member 32" against the shoulder 26*b* of the tube 26 and the seat surface 33 of the bearing housing 28.

All of the above described alternatives provide for a method of assembling a service tube to an engine component, wherein the method comprises: threadably engaging the service tube with the engine component; and frictionally locking the service tube against rotation relative to the engine component. The locking can include tightening a locking member having a conical surface in compression against a conical seat jointly formed by an outer shoulder on the service tube and a seat surface on the engine component. Tightening can include tightening a bolt in a corresponding threaded bore defined in the engine component at a location generally corresponding to a center of the conical seat. The locking member can be pre-assembled on the shank of the bolt and retained thereon by a retaining clip.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the service tube has been described as a service tube for providing oil to a bearing, it is understood that the service tube could be mounted to other engine components or mating parts. For instance, the service tube may be used to transport air or oil from between a sump and an external conduit, such as an oil supply or scavenge line, or sump pressurization or vent line. Also, it is understood that a wide variety of mechanical fasteners may be used to adjustably press or clamp the locking member against the outer shoulder of the service tube. Yet further modifications could be implemented by a person of ordinary skill in the art in view of the present disclosure, which modifications would be within the scope of the present technology.

The invention claimed is:

1. A service tube assembly for an aircraft engine, comprising:
    a service tube having a threaded end portion and an outer shoulder adjacent to the threaded end portion, the outer shoulder having a conical surface converging in a direction away from the threaded end portion;
    a mating part threadably engaged with the threaded end portion of the service tube, the mating part having a seat surface surrounding at least a portion of a circumference of the outer shoulder of the service tube, the seat surface of the mating part and the conical surface of the outer shoulder of the service tube being spaced-apart and cooperating to form a conical seat therebetween;
    a locking member received in the conical seat between the seat surface of the mating part and the conical outer shoulder of the service tube, the locking member having an outer conical surface complementary to the conical seat; and
    a mechanical fastener releasably holding the locking member against the conical seat.

2. The service tube assembly defined in claim 1, wherein the conical seat has a central axis, and wherein the mechanical fastener is coaxially aligned with the central axis of the conical seat.

3. The service tube assembly defined in claim 1, wherein the mechanical fastener has a shank extending through a central bore defined in the locking member, the central bore having a greater cross-section than that of the shank to provide for an annular gap between the shank and the locking member.

4. The service tube assembly defined in claim 1, wherein at least one of the conical surface of the outer shoulder and the outer conical surface of the locking member has a textured finish.

5. The service tube assembly defined in claim 4, wherein the conical surface of the outer shoulder of the service tube and the outer conical surface of the locking member have a knurled surface finish.

6. The service tube assembly defined in claim 1, wherein the locking member has a material hardness less than that of the service tube and the mating part.

7. The service tube assembly defined in claim 1, wherein the mechanical fastener includes a threaded fastener threadably engaged with the mating part, the threaded fastener torqued to compress the locking member against the conical seat.

8. The service tube assembly defined in claim 1, wherein the mechanical fastener includes a bolt threadably engaged in a threaded bore defined in the mating part.

9. The service tube assembly defined in claim 8, wherein the bolt has a head and a threaded shank, and wherein the locking member is integrated to the head of the bolt.

10. The service tube assembly defined in claim 8, wherein the bolt has a head and a shank, and wherein the locking member is loosely fitted on the shank and retained thereon by a retaining clip.

11. The service tube assembly defined in claim 10, wherein the threaded bore is disposed generally centrally relative to the conical seat.

12. The service tube assembly defined in claim 7, wherein the threaded fastener comprises a threaded stud projecting from the mating part and a nut threadably engaged with the threaded stud, the threaded stud projecting through a central bore defined in the locking member, the nut tightened on the threaded stud to compress the locking member against the conical seat.

13. A turbine exhaust case comprising:
   an outer duct wall and an inner duct wall defining therebetween an annular gas path about an engine axis;
   a strut extending across the annular gas path;
   a service tube extending through the strut, the service tube having a threaded inner end portion and an outer shoulder adjacent to the threaded inner end portion, the outer shoulder having a conical surface converging in a direction away from the threaded end portion;
   a bearing housing disposed radially inwardly from the inner duct wall, the bearing housing having a threaded bore, the threaded inner end portion of the service tube threadably engaged with the threaded bore, the bearing housing further having a seat surface surrounding at least a portion of a circumference of the threaded bore, the seat surface of the bearing housing disposed laterally outside of the threaded bore and cooperating with the outer shoulder of the service tube to form a conical seat laterally adjacent to the threaded bore;
   a locking member having a conical surface seated against the conical seat; and
   a threaded fastener threadably engaged with the bearing housing, the threaded fastener tightened to press the locking member against the conical seat.

14. The turbine exhaust case defined in claim 13, wherein the threaded fastener is generally centrally disposed relative to the conical seat.

15. The turbine exhaust case defined in claim 14, wherein the locking member has a central bore, the threaded fastener extending through the central bore.

16. The turbine exhaust case defined in claim 15, wherein the threaded fastener includes a bolt having a head and a shank, and a retaining clip engaged on the shank to retain the locking member on the shank.

17. The turbine exhaust case defined in claim 16, wherein the central bore of the locking member has a cross-section greater than that of the shank.

18. A method of assembling a service tube to an engine component, the method comprising:
   threadably engaging a threaded end portion of the service tube with the engine component; and
   locking the service tube against rotation relative to the engine component, including tightening a locking member having a conical surface in compression against a conical seat jointly formed by an outer shoulder on the service tube and a seat surface on the engine component, the conical surface of the looking member converging in a direction away from the threaded end portion of the service tube and the engine component.

19. The method defined in claim 18, wherein the tightening includes tightening a bolt in a corresponding threaded bore defined in the engine component at a location generally corresponding to a center of the conical seat.

20. The method defined in claim 18, comprising pre-assembling the locking member on a shank of a bolt, and retaining the locking member on the shank with a retaining clip.

\* \* \* \* \*